(12) United States Patent
Sakaguchi et al.

(10) Patent No.: US 11,113,991 B2
(45) Date of Patent: Sep. 7, 2021

(54) HUMAN BODY MODEL

(71) Applicant: TERUMO KABUSHIKI KAISHA, Tokyo (JP)

(72) Inventors: Yuuki Sakaguchi, Isehara (JP); Souichirou Sugihara, Fujinomiya (JP); Keiichiro Yamamoto, Hiratsuka (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 399 days.

(21) Appl. No.: 16/106,702

(22) Filed: Aug. 21, 2018

(65) Prior Publication Data
US 2019/0057622 A1  Feb. 21, 2019

(30) Foreign Application Priority Data

Aug. 21, 2017 (JP) .............................. JP2017-158688

(51) Int. Cl.
*G09B 23/30* (2006.01)
*G09B 23/28* (2006.01)

(52) U.S. Cl.
CPC ......... *G09B 23/285* (2013.01); *G09B 23/286* (2013.01); *G09B 23/30* (2013.01)

(58) Field of Classification Search
CPC ................................ G09B 23/28; G09B 23/30
See application file for complete search history.

(56) References Cited

U.S. PATENT DOCUMENTS

| | | | | |
|---|---|---|---|---|
| 3,226,846 A * | 1/1966 | Wood | ..................... | G09B 23/28 434/272 |
| 4,198,766 A * | 4/1980 | Camin | .................. | G09B 23/285 434/272 |
| 4,332,569 A * | 6/1982 | Burbank | .............. | G09B 23/285 434/272 |
| 4,726,772 A * | 2/1988 | Amplatz | .............. | G09B 23/285 434/272 |
| 4,907,973 A * | 3/1990 | Hon | ..................... | G09B 23/285 434/262 |
| 5,112,228 A * | 5/1992 | Zouras | ................. | G09B 23/285 434/267 |
| 6,503,273 B1 * | 1/2003 | McAllister | ................ | A61F 2/06 623/1.41 |
| 7,306,465 B2 * | 12/2007 | White | .................. | G09B 23/285 434/268 |

(Continued)

FOREIGN PATENT DOCUMENTS

JP 2905471 B1 2/1998

*Primary Examiner* — Kurt Fernstrom
(74) *Attorney, Agent, or Firm* — Buchanan Ingersoll & Rooney PC

(57) ABSTRACT

A human body model is disclosed that can make an image acquired by a medical device similar to an image of a body lumen acquired during surgery. The human body model includes a main body portion that includes a lumen passing through a portion of the main body portion between a first surface and a second surface disposed on a side opposite to the first surface, and a tubular body that is provided in at least a part of the lumen and is made of another material different from the material of the main body portion. An acoustic impedance of the material of the tubular body being equal to an acoustic impedance of a body lumen, and a hardness of the material of the main body portion being higher than a hardness of the material of the tubular body.

17 Claims, 10 Drawing Sheets

(56) References Cited

U.S. PATENT DOCUMENTS

| | | | | |
|---|---|---|---|---|
| 7,507,092 B2* | 3/2009 | Sakezles | ................ | G09B 23/28 |
| | | | | 434/267 |
| 8,469,717 B2* | 6/2013 | Park | .................... | G09B 23/303 |
| | | | | 434/268 |
| 8,636,520 B2* | 1/2014 | Iwasaki | ................ | G09B 23/288 |
| | | | | 434/272 |
| 8,702,431 B2* | 4/2014 | Ikeno | ................... | G09B 23/303 |
| | | | | 434/267 |
| 8,764,452 B2* | 7/2014 | Pravong | ............... | G09B 23/306 |
| | | | | 434/272 |
| 2005/0016548 A1* | 1/2005 | Brassel | ............... | B29C 49/0042 |
| | | | | 128/898 |
| 2008/0076101 A1* | 3/2008 | Hyde | ........ | G09B 23/30 |
| | | | | 434/272 |
| 2008/0299529 A1* | 12/2008 | Schaller | ............... | G09B 23/306 |
| | | | | 434/267 |
| 2012/0329904 A1* | 12/2012 | Suita | ...................... | C08K 3/013 |
| | | | | 523/105 |
| 2013/0137075 A1* | 5/2013 | Forsythe | ................ | G09B 23/28 |
| | | | | 434/272 |
| 2015/0037776 A1* | 2/2015 | Redaelli | ................ | G09B 23/30 |
| | | | | 434/272 |
| 2015/0112419 A1* | 4/2015 | Ahn | ................... | A61L 27/3826 |
| | | | | 623/1.13 |
| 2019/0139452 A1* | 5/2019 | Hall-Jackson | ....... | G09B 23/285 |

* cited by examiner

HUMAN BODY MODEL

CROSS-REFERENCES TO RELATED APPLICATIONS

This application claims priority to Japanese Application No. 2017-158688 filed on Aug. 21, 2017, the entire content of which is incorporated herein by reference.

BACKGROUND OF THE INVENTION

The present disclosure generally relates to a human body model used for at least one of basic study and technique acquisition for a medical device that is inserted into a body lumen and acquires an image of the inside of the body lumen by using ultrasound waves.

DESCRIPTION

For example, a surgery technique for percutaneously treating a target lesion by a catheter is used in the treatment of a vasoconstriction site. As such a surgery technique, a method of expanding a stenosed site by a balloon catheter that includes a balloon at the distal end of the balloon catheter, and a method of placing a metal tube called a stent are performed. In a case in which a vasoconstriction site is to be treated, preferred methods are selected or combined according to attributes of a stenosed site or the condition of a patient among the surgery methods.

In a case in which such a vasoconstriction site is to be percutaneously treated, a diagnostic catheter can be used to observe the attributes, shape, form, structure, and the like of a stenosed site, to assist a determination to select treatment mean, and to observe the condition of the treated stenosed site as well. As the diagnostic catheter, a catheter for ultrasonography that transmits ultrasound waves to a target lesion or the wall of a blood vessel and receives ultrasound waves reflected by the target lesion or the wall of a blood vessel are used.

A human body model including mechanical components and the like can be used in the basic study for the catheter for ultrasonography. That is, since living bodies have individual differences, it is desirable that a human body model is used to perform basic study for the diagnostic catheter. Meanwhile, examples of the basic study for the diagnostic catheter include observation and measurement of a simulated blood vessel.

Further, a human body model can also be required in the acquisition of medical techniques using a diagnostic catheter. That is, advanced knowledge and experience about a basis and clinic are required for the acquisition of medical practices. It is generally difficult to acquire medical practices from only classroom lectures. Specifically, for example, it can be hard to interpret images that are acquired by a diagnostic catheter. For this reason, medical workers try to improve capabilities to interpret images, which are acquired by a diagnostic catheter, by repeatedly checking images that are used in textbooks or images that are taken during surgery.

However, in this case, medical workers look at obtained data (the images of the textbooks or the images taken during surgery). For this reason, the medical workers cannot acquire medical techniques or improve interpretation capabilities while touching the diagnostic catheter. On the other hand, pre-training using organ models and the like can be generally performed to acquire surgery techniques or diagnostic techniques. Accordingly, medical workers can try to improve performance for treating a patient. As described above, a human body model can be used in the acquisition of medical techniques using a diagnostic catheter. In a case in which a human body model is used for the acquisition of medical techniques using a diagnostic catheter, it is possible to contribute to an increase or improve in the medical techniques of an operator using a diagnostic catheter.

Japanese Patent No. 2905471 discloses a human body model for medical practices using ultrasound waves that includes an organ model built in a human body model made of liquid silicon rubber. The organ model disclosed in Japanese Patent No. 2905471 changes a color tone on an image processing monitor using ultrasound waves applied to a molded-cured product. The molded-cured product is formed by molding and curing liquid silicon rubber. Further, in a case in which the entire human body model is made of a soft material, such as liquid silicon rubber, there is a concern that, for example, a change in the dimensions of the human body model or the deformation of a stent placed in the human body model may occur. Furthermore, even in a case in which a mechanism for positioning the axis of a shaft portion of the diagnostic catheter relative to the human body model is provided, there is a concern that the accuracy of positioning of the axis may deteriorate. For this reason, there is a concern that the reproducibility of observation or measurement of, for example, a simulated blood vessel may deteriorate in regard to basic study, or technique acquisition for the diagnostic catheter.

On the other hand, in a case in which the entire human body model is made of a material of which the hardness is higher than the hardness of silicon rubber, a difference between the acoustic impedance of a living body, such as a blood vessel, and the acoustic impedance of the human body model is larger than that in a case in which the entire human body model is made of silicon rubber. For this reason, the image of the human body model, which is acquired by the diagnostic catheter, is significantly different from the image of a living body that is to be acquired by the diagnostic catheter during surgery. For example, the brightness of the image of the human body model acquired by the diagnostic catheter is relatively increased, but the brightness of the image of a living body to be acquired by the diagnostic catheter during surgery is relatively reduced. Further, in a case in which the entire human body model is made of a hard material, a stent, which is expanded and placed in the human body model, may recoil. For this reason, it may be difficult to pressure-fix the stent in the human body model.

SUMMARY OF THE INVENTION

A human body model is disclosed that can make an image acquired by a medical device similar to an image of a body lumen acquired during surgery, and helping suppress (or prevent) the deterioration of the reproducibility of observations and/or measurements acquired by the medical device.

According to an aspect of the invention, a human body model is disclosed, which can be used for at least one of basic study and technique acquisition for a medical device that is inserted into a body lumen and acquires an image of an inside of the body lumen using ultrasound waves. The human body model includes a main body portion that includes a lumen passing through a portion of the main body portion between a first surface and a second surface disposed on a side opposite to the first surface, and a tubular body that is provided in at least a part of the lumen and is made of another material different from a material of the main body portion. Acoustic impedance of the material of the tubular body is equal to acoustic impedance of the body lumen, and a hardness of the material of the main body portion is higher than a hardness of the material of the tubular body.

According to the above-mentioned structure, the human body model includes the main body portion that includes the lumen passing through a portion of the main body portion between the first surface and the second surface, and the tubular body that is provided in at least a part of the lumen. The material of the main body portion is different from the material of the tubular body. Further, the acoustic impedance of the material of the tubular body is equal to the acoustic impedance of the body lumen. For this reason, a difference between the acoustic impedance of a body lumen, such as a blood vessel, and the acoustic impedance of the human body model can be suppressed. Accordingly, the image of the human body model, which is acquired by the medical device, is equal to the image of the body lumen that is acquired by the medical device during surgery. That is, the image, which is acquired by the medical device, can be similar to the image of the body lumen that is to be acquired during surgery. Furthermore, since the tubular body provided in the lumen is made of a soft material having acoustic impedance equal to the acoustic impedance of a body lumen, the recoil of a stent, which is expanded and placed in the tubular body, can be relatively suppressed (or prevented). Accordingly, the stent can be pressure-fixed in the tubular body.

In accordance with an aspect, the hardness of the material of the main body portion is higher than the hardness of the material of the tubular body. For this reason, even in a case in which the tubular body provided in the lumen is made of a soft material having acoustic impedance equal to the acoustic impedance of a body lumen, the main body portion can help suppress (or prevent) a change in the dimensions of the tubular body or the deformation of a stent placed in the tubular body. In addition, even in a case in which a mechanism for positioning the axis of the shaft portion of the medical device is provided, the deterioration of the accuracy of positioning of the axis can be suppressed. Accordingly, the deterioration of the reproducibility of observation or measurement of, for example, a simulated blood vessel can be suppressed in regard to basic study, technique acquisition, or the like for the medical device.

Preferably, the tubular body is provided over an entire length of the lumen.

According to the above-mentioned structure, since the tubular body is provided over the entire length of the lumen, the deterioration of the reproducibility of observation or measurement of, for example, a simulated blood vessel can be suppressed over the entire length of the lumen. Further, an image acquired by the medical device over the entire length of the lumen can be made close to the image of a body lumen to be acquired during surgery. Accordingly, a user of the human body model can perform basic study, technique acquisition, or the like for the medical device by effectively using the entire length of the lumen.

Preferably, the main body portion includes one of a convex portion and a concave portion that are fitted to each other, and the tubular body includes the other of the convex portion and the concave portion that are fitted to each other.

According to the above-mentioned structure, the movement of the tubular body provided in the lumen can be suppressed when the medical device is inserted into the lumen of the main body portion or removed from the lumen of the main body portion.

According to the aspect of the disclosure, it is possible to provide a human body model that can make an image acquired by a medical device similar be (or close to) the image of a body lumen to be acquired during surgery while suppressing the deterioration of the reproducibility of observation or measurement.

A system is disclosed for at least one of basic study and technique acquisition for a medical device that is inserted into a body lumen and acquires an image of an inside of the body lumen using ultrasound waves, the system comprising: one or more human body models, each of the one or more human body models including a main body portion having a lumen passing through a portion of the main body portion between a first surface of the main body portion and a second surface of the main body portion, the second surface of the main body portion being arranged on a side opposite to the first surface of the main body portion, a tubular body provided in at least a part of the lumen, the tubular body being made of a material different from a material of the main body portion, and an acoustic impedance of the material of the tubular body being equal to an acoustic impedance of the body lumen.

A method is disclosed for at least one of basic study and technique acquisition for a medical device that is inserted into a body lumen and acquires an image of an inside of the body lumen using ultrasound waves, the method comprising: providing one or more human body models, each of the one or more human body models including a main body portion having a lumen passing through a portion of the main body portion between a first surface of the main body portion and a second surface of the main body portion, the second surface of the main body portion being arranged on a side opposite to the first surface of the main body portion, a tubular body provided in at least a part of the lumen, the tubular body being made of a material different from a material of the main body portion, and wherein an acoustic impedance of the material of the tubular body is equal to an acoustic impedance of the body lumen; and inserting the medical device into the lumen of the one or more human body models.

DETAILED DESCRIPTION OF THE INVENTION

Figure 1:
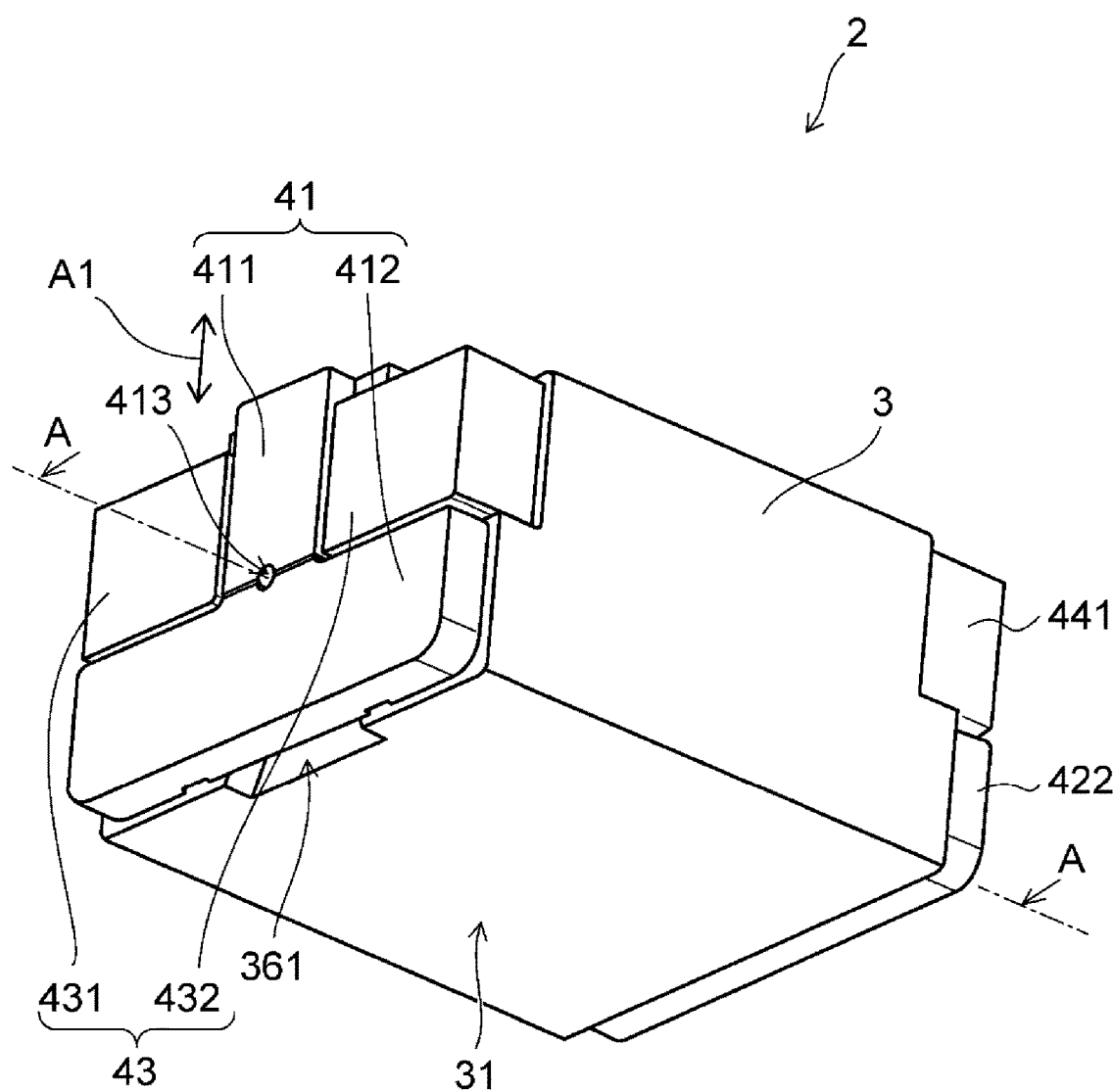
FIG. 1 is a perspective view of a human body model of an exemplary embodiment of the disclosure.

Preferred embodiments of the invention will be described in detail below with reference to the drawings.

Since an embodiment to be described below is a preferred specific example of the invention, technically preferable various limitations are given to the embodiment. However, the scope of the invention is not limited to these aspects as long as the limitations on the invention are not particularly described in the following description. Further, the same components will be denoted in the respective drawings by the same reference numerals and the detailed description of the same components will be appropriately omitted.

FIGS. 1 to 4 are perspective views of a human body model of an exemplary embodiment of the disclosure. FIG. 5 is a cross-sectional view taken along a cutting plane A-A illustrated in FIG. 1.

Figure 2:
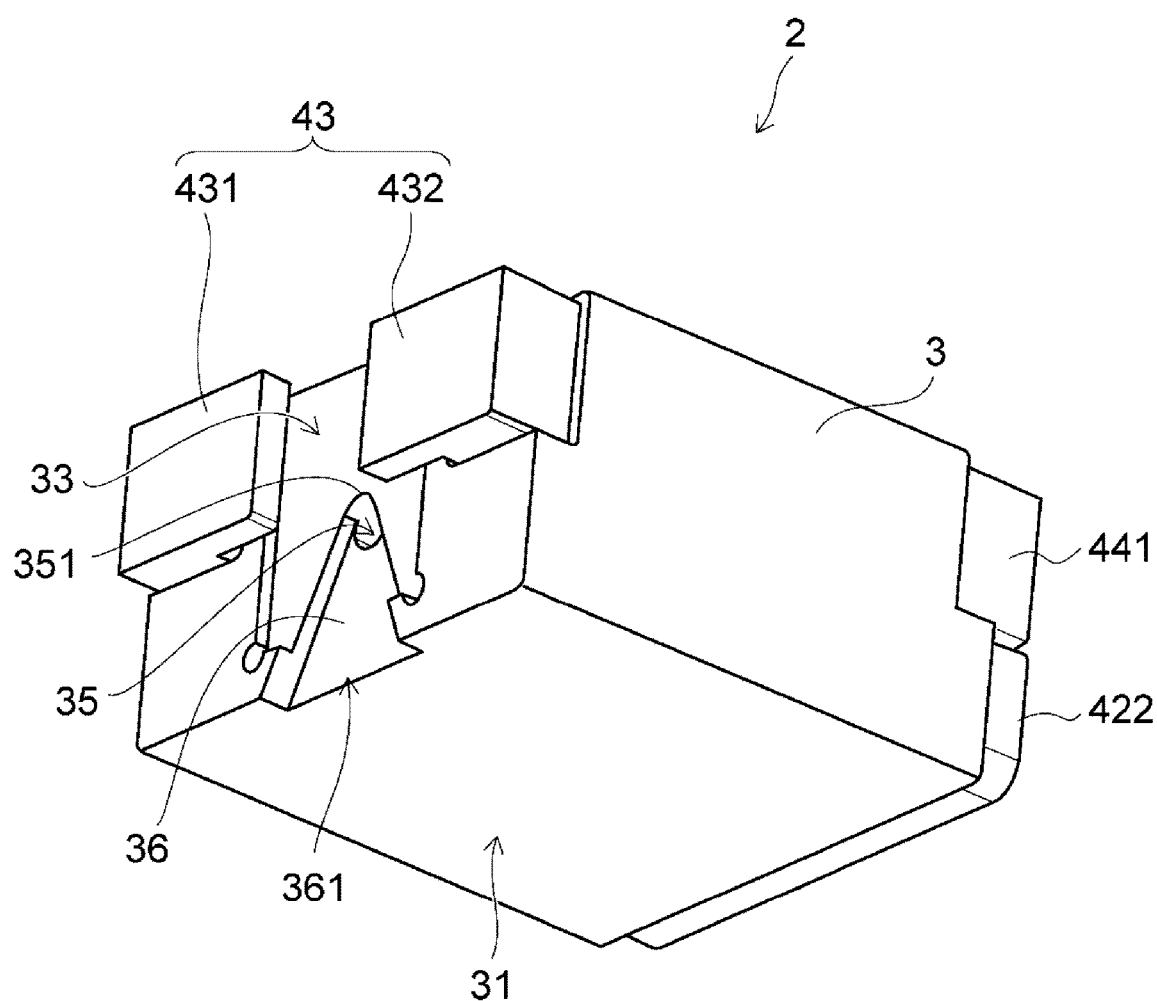
FIG. 2 is a perspective view of the human body model of the exemplary embodiment.

For the convenience of illustration, a first holding portion 41 is omitted in FIG. 2. Further, for the convenience of illustration, a second holding portion 42 is omitted in FIG. 4.

Figure 6:
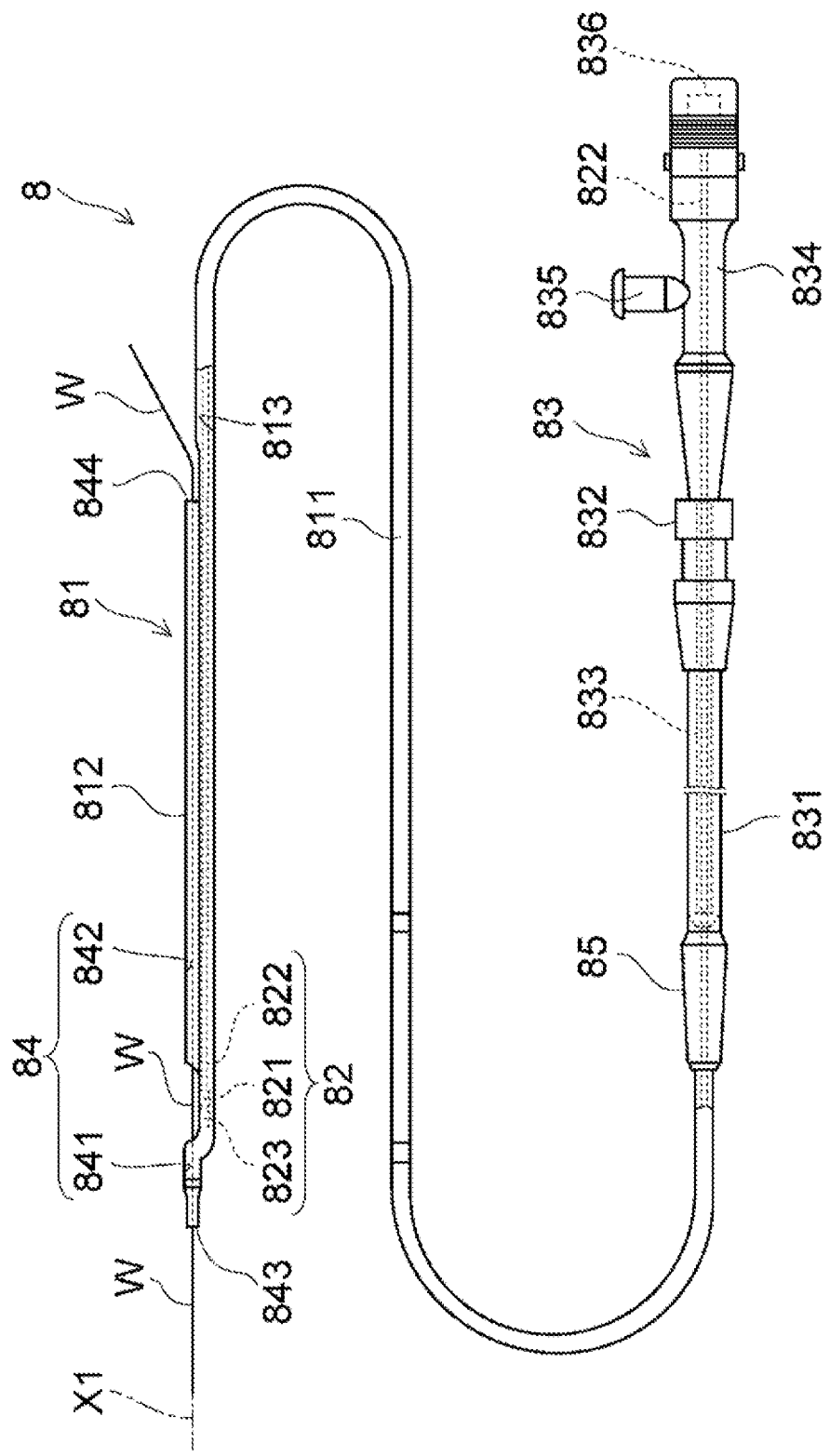
FIG. 6 is a plan view illustrating an example of a medical device of the exemplary embodiment.

A human body model 2 of an exemplary embodiment can be used for at least one of basic study and technique acquisition for a medical device 8 (see FIG. 6). The medical device 8 can be inserted into a body lumen, such as a blood vessel, and the medical device 8 can transmit ultrasound waves to a target lesion, and receive ultrasound waves reflected by the target lesion. The medical device 8 may be used to diagnose the inside of a body lumen, and may be used to treat the inside of a body lumen. The details of the medical device 8 will be described later with reference to FIG. 6.

The human body model 2 of the exemplary embodiment can include a main body portion 3, a first holding portion 41, a second holding portion 42, a first guide portion 43, a second guide portion 44, and a tubular body (or pipe body) 5. The first and second guide portions 43 and 44 may be formed integrally with the main body portion 3.

In accordance with an exemplary embodiment, the main body portion 3 has the shape of a substantially rectangular parallelepiped, and is made of a material including, for example, a resin, such as polycarbonate. However, the material of the main body portion 3 is not limited to polycarbonate as long as the deformation of the main body portion 3 can be suppressed, a change in the dimensions of the tubular body 5 can be suppressed, the deformation of the tubular body 5 can be suppressed, or the deformation of a stent placed in the tubular body 5 can be suppressed. In a case in which the material of the main body portion 3 is transparent, a user of the human body model 2 can observe the states of the stent placed in the main body portion 3, the medical device 8 inserted into the main body portion 3, and the like from the outside of the main body portion 3.

As illustrated in FIG. 5, the main body portion 3 includes a lumen 35 into which the medical device 8 is to be inserted. The lumen 35 passes through a portion of the main body portion 3 between a first surface 33 (see FIG. 2) of the main body portion 3 and a second surface 34 (see FIG. 4) of the main body portion 3. The first surface 33 corresponds to one side surface of the main body portion 3. The second surface 34 corresponds to the other side surface of the main body portion 3 that is disposed on the side opposite to the first surface 33.

As illustrated in FIG. 2, the main body portion 3 includes a first flow path 36. The first flow path 36 includes a first opening portion 361 formed on a first outer surface 31, and is connected to one end portion 351 of the lumen 35. That is, one end portion of the first flow path 36 is connected to the first outer surface 31, and is opened to the first outer surface 31 as the first opening portion 361. The other end portion of the first flow path 36 is connected to one end portion 351 of the lumen 35. The first outer surface 31 is a surface different from the first and second surfaces 33 and 34, and corresponds to a lower surface that is positioned on the lower side when seen from the lumen 35 in a case in which the lumen 35 is filled with liquid. Examples of the liquid that is filled in the lumen 35 include blood, saline (i.e., saline solution), tap water (i.e., water), and simulated blood. As illustrated in FIG. 2, the cross-sectional area of the first flow path 36 is reduced toward one end portion 351 of the lumen 35 from the first opening portion 361. Here, "the cross-sectional area of the first flow path 36" means the opening area of the first flow path 36 on a plane crossing a direction toward one end portion 351 of the lumen 35 from the first opening portion 361.

Figure 4:
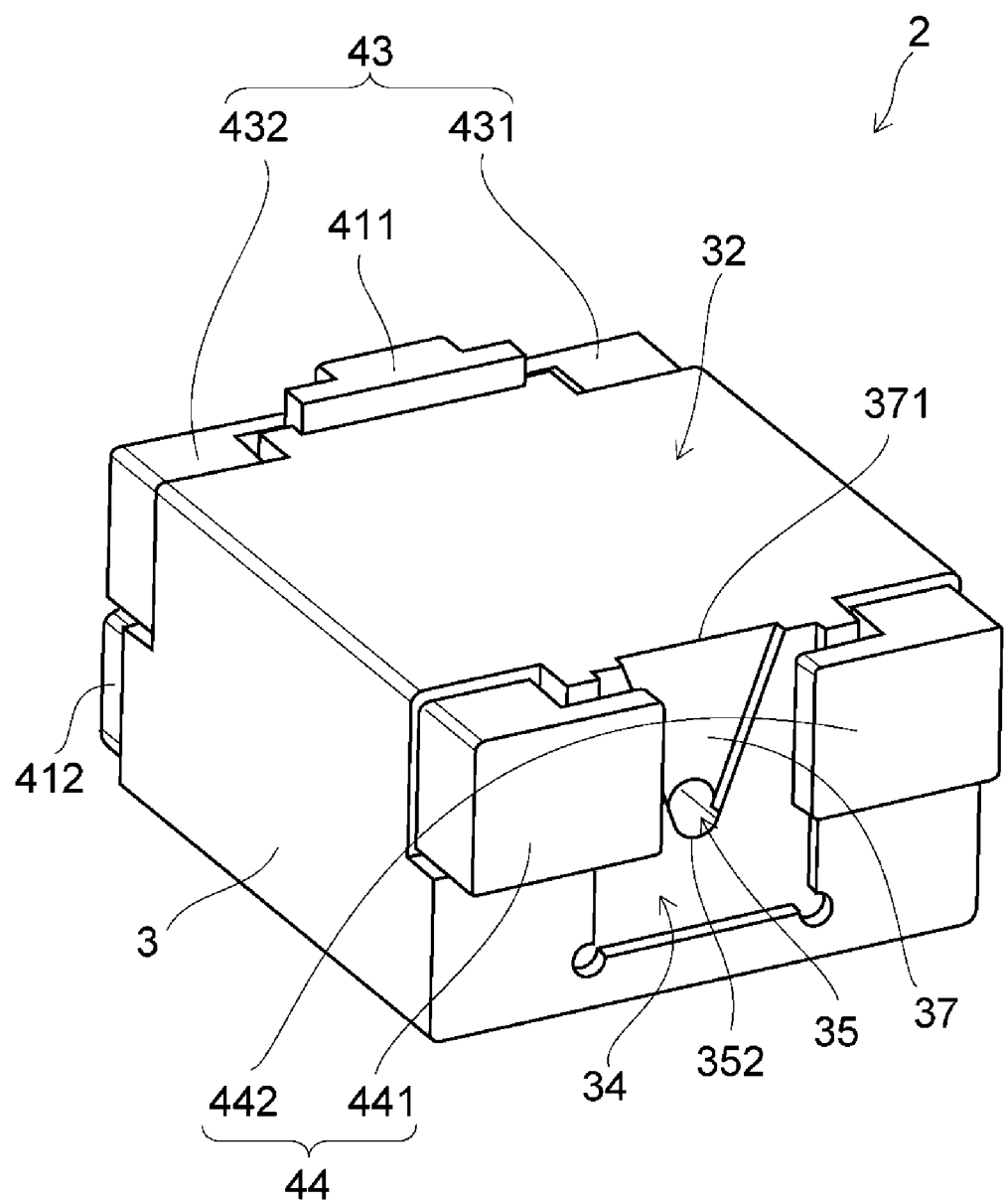
FIG. 4 is a perspective view of the human body model of the exemplary embodiment.
Figure 5:
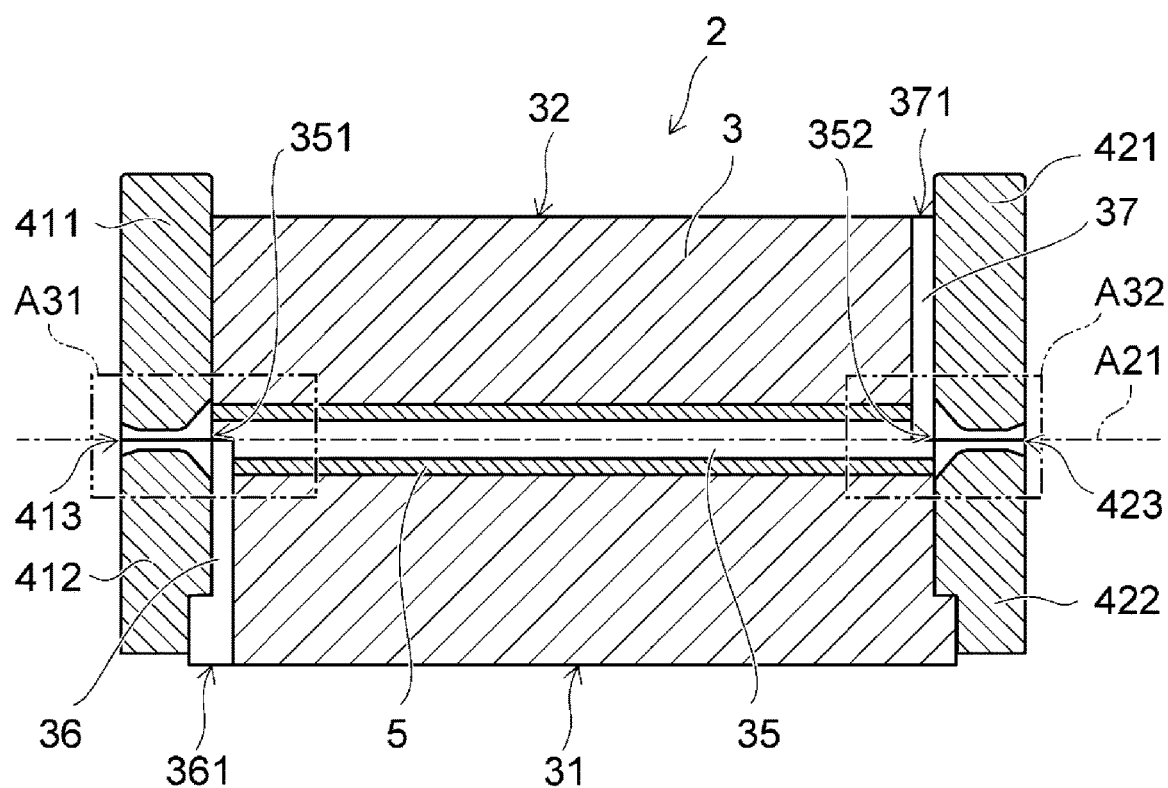
FIG. 5 is a cross-sectional view taken along a cutting plane A-A illustrated in FIG. 1.

As illustrated in FIG. 4, the main body portion 3 includes a second flow path 37. The second flow path 37 includes a second opening portion 371 formed on a second outer surface 32, and is connected to the other end portion 352 of the lumen 35. That is, one end portion of the second flow path 37 is connected to the other end portion 352 of the lumen 35. The other end portion of the second flow path 37 is connected to the second outer surface 32, and is opened to the second outer surface 32 as the second opening portion 371. The second outer surface 32 is a surface different from the first and second surfaces 33 and 34, and is a surface that is disposed on the side opposite to the first outer surface. The second outer surface 32 corresponds to an upper surface that is positioned on the upper side when seen from the lumen 35 in a case in which the lumen 35 is filled with liquid. As illustrated in FIG. 4, the cross-sectional area of the second flow path 37 is increased toward the second opening portion 371 from the other end portion 352 of the lumen 35. Here, "the cross-sectional area of the second flow path 37" means the opening area of the second flow path 37 on a plane crossing a direction toward the second opening portion 371 from the other end portion 352 of the lumen 35.

The first holding portion 41 and the first guide portion 43 are provided at a position facing the first surface 33 of the main body portion 3. The first holding portion 41 includes a first movable portion 411 and a first fixed portion 412. As illustrated by an arrow A1 of FIG. 1, the first movable portion 411 is guided by the first guide portion 43 and can be moved in a direction crossing the longitudinal direction of the lumen 35 (the direction of an axis A21 of the lumen 35). The first guide portion 43 includes a first guide support portion 431 provided on one side of the first movable portion 411 and a second guide support portion 432 provided on the other side of the first movable portion 411, and supports the first movable portion 411 from both sides and guides the movement of the first movable portion 411. The first fixed portion 412 is fixed at a position facing the first surface 33 of the main body portion 3, and supports the first movable portion 411. That is, the first fixed portion 412 functions as a stopper for the first movable portion 411. Each of the first holding portion 41 and the first guide portion 43 is made of a material including, for example, a resin, such as polyoxymethylene (also known as polyacetal). However, the material of each of the first holding portion 41 and the first guide portion 43 is not limited to polyoxymethylene (or polyacetal).

The second holding portion 42 and the second guide portion 44 are provided at a position facing the second surface 34 of the main body portion 3. The second holding portion 42 includes a second movable portion 421 and a second fixed portion 422. As illustrated by an arrow A2 of FIG. 3, the second movable portion 421 is guided by the second guide portion 44 and can be moved in a direction crossing the longitudinal direction of the lumen 35 (the direction of the axis A21 of the lumen 35). The second guide portion 44 includes a third guide support portion 441 provided on one side of the second movable portion 421 and a fourth guide support portion 442 provided on the other side of the second movable portion 421, and supports the second movable portion 421 from both sides and guides the movement of the second movable portion 421. The second fixed portion 422 is fixed at a position facing the second surface 34 of the main body portion 3, and supports the second movable portion 421. That is, the second fixed portion 422 functions as a stopper for the second movable portion 421. Each of the second holding portion 42 and the second guide portion 44 is made of a material including, for example, a resin, such as polyacetal. However, the material of each of the second holding portion 42 and the second guide portion 44 is not limited to polyacetal.

As illustrated in FIGS. 1 and 5, the first holding portion 41 includes a first through-hole 413. Specifically, the first movable portion 411 includes a concave portion 413A (see FIG. 7) on a portion of first movable portion 411 facing the first fixed portion 412. On the other hand, the first fixed portion 412 includes a concave portion 413B (see FIG. 7) on a portion of the first fixed portion 412 facing the first movable portion 411. The concave portion 413A of the first movable portion 411 and the concave portion 413B of the first fixed portion 412 face each other, so that the first through-hole 413 is formed. In other words, the first through-hole 413 is formed by a combination of the concave portion 413A of the first movable portion 411 and the concave portion 413B of the first fixed portion 412. The first through-hole 413 is connected to the lumen 35 of the main body portion 3. Specifically, one end portion of the first through-hole 413 is opened to the outside of the human body model 2. The other end portion of the first through-hole 413 is opened to the lumen 35 of the main body portion 3. For this reason, the medical device 8 is inserted into the lumen 35 or removed from the lumen 35 through the first through-hole 413. In a state in which the first movable portion 411 is not yet moved relative to the first fixed portion 412, that is, in a state in which the first movable portion 411 is supported by the first fixed portion 412, the opening area of the first through-hole 413 is smaller than the opening area of the lumen 35.

Figure 3:
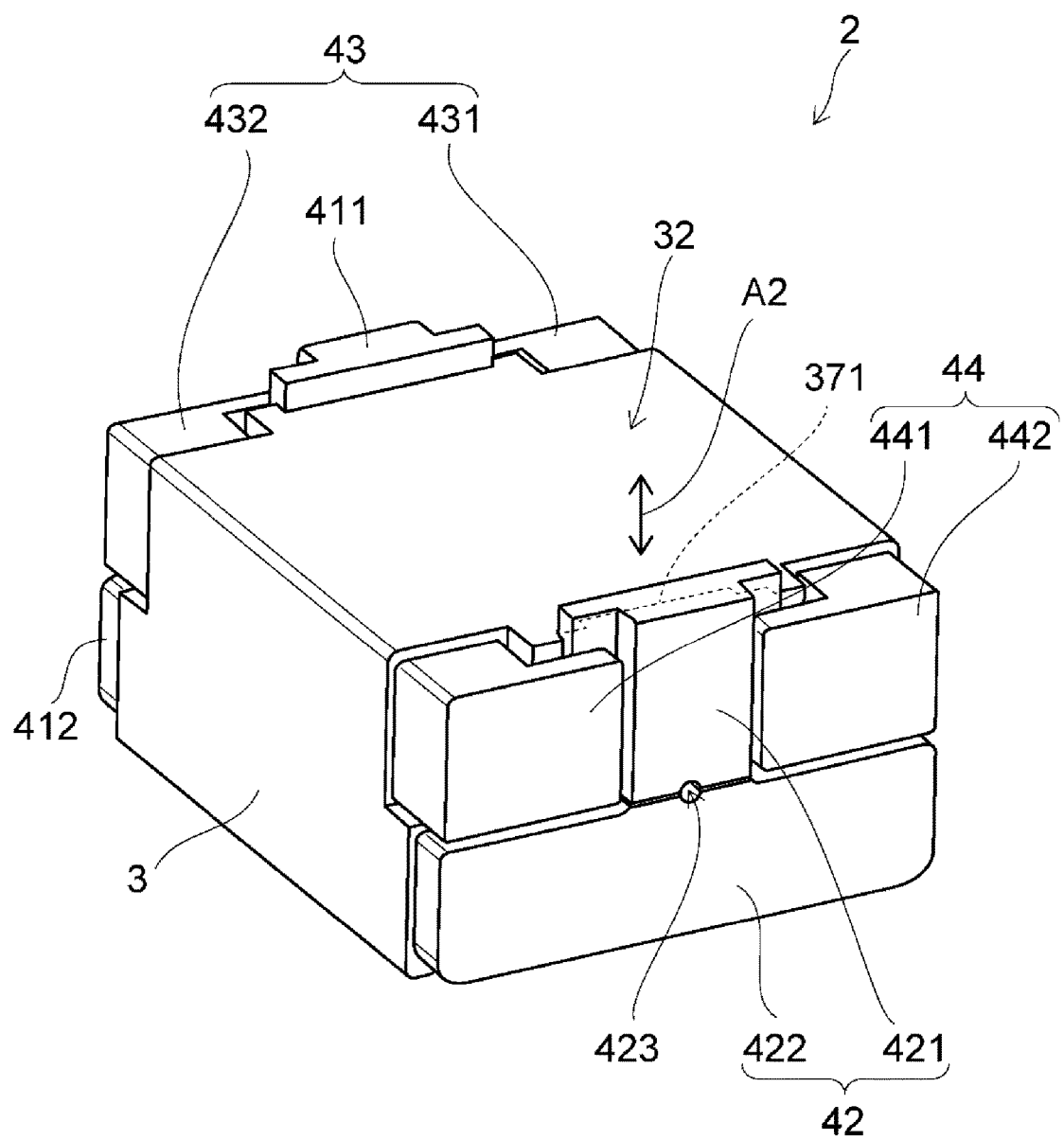
FIG. 3 is a perspective view of the human body model of the exemplary embodiment.

As illustrated in FIGS. 3 and 5, the second holding portion 42 includes a second through-hole 423. Specifically, the second movable portion 421 includes a concave portion 423A (see FIG. 8) on a portion of the second movable portion 421 facing the second fixed portion 422. On the other hand, the second fixed portion 422 includes a concave portion 423B (see FIG. 8) on a portion of the second fixed portion 422 facing the second movable portion 421. The concave portion 423A of the second movable portion 421 and the concave portion 423B of the second fixed portion 422 face each other, so that the second through-hole 423 is formed. In other words, the second through-hole 423 is formed by a combination of the concave portion 423A of the second movable portion 421 and the concave portion 423B of the second fixed portion 422. The second through-hole 423 is connected to the lumen 35 of the main body portion 3. Specifically, one end portion of the second through-hole 423 is opened to the outside of the human body model 2. The other end portion of the second through-hole 423 is opened to the lumen 35 of the main body portion 3. For this reason, the medical device 8 is inserted into the lumen 35 or removed from the lumen 35 through the second through-hole 423. In a state in which the second movable portion 421 is not yet moved relative to the second fixed portion 422, that is, in a state in which the second movable portion 421 is supported by the second fixed portion 422, the opening area of the second through-hole 423 is smaller than the opening area of the lumen 35.

As described above, the first movable portion 411 of the first holding portion 41 can be moved relative to the first fixed portion 412 of the first holding portion 41 in the direction of the arrow A1 illustrated in FIG. 1. Accordingly, the opening area of the first through-hole 413 is adapted to be changeable. The first holding portion 41 changes the opening area of the first through-hole 413 to allow a shaft portion of the medical device 8 to pass relatively smoothly through the first through-hole 413 in a case in which the shaft portion of the medical device 8 passes through the first through-hole 413, and positions the axis of the shaft portion of the medical device 8 relative to the lumen 35 in a state in which the shaft portion of the medical device 8 passes through the first through-hole 413.

Further, the second movable portion 421 of the second holding portion 42 can be moved relative to the second fixed portion 422 of the second holding portion 42 in the direction of the arrow A2 illustrated in FIG. 3. Accordingly, the opening area of the second through-hole 423 is adapted to be changeable. The second holding portion 42 changes the opening area of the second through-hole 423 to allow the shaft portion of the medical device 8 to pass relatively smoothly through the second through-hole 423 in a case in which the shaft portion of the medical device 8 passes through the second through-hole 423, and positions the axis of the shaft portion of the medical device 8 relative to the lumen 35 in a state in which the shaft portion of the medical device 8 passes through the second through-hole 423.

The tubular body (or pipe body) 5 is provided in the lumen 35 of the main body portion 3. The tubular body 5 has a tubular structure. That is, the tubular body 5 has the shape of a hollow column. For this reason, the medical device 8 is inserted into the tubular body 5 provided in the lumen 35 or removed from the tubular body 5 provided in the lumen 35 through at least one of the first and second through-holes 413 and 423. As illustrated in FIG. 5, the tubular body 5 is provided over an entire length of the lumen 35 in the human body model 2 according to this embodiment. However, the tubular body 5 may not be provided over the entire length of the lumen 35, and may be provided at a part of the lumen 35 in the longitudinal direction (the direction of the axis A21 of the lumen 35). Alternatively, a plurality of tubular bodies 5 may be arranged at predetermined intervals in the longitudinal direction of the lumen 35 (the direction of the axis A21 of the lumen 35). That is, the tubular body 5 is provided in at least a part of the lumen 35.

In accordance with an exemplary embodiment, the acoustic impedance of the material of the tubular body 5 is equal to the acoustic impedance of a body lumen into which the medical device 8 is to be inserted. The acoustic impedance of a blood vessel (artery) is, for example, about $1.72 \times 10^5$ g/(cm$^2 \cdot$s). The acoustic impedance of fat is, for example, about $1.40 \times 10^5$ g/(cm$^2 \cdot$s). The acoustic impedance of muscle is, for example, about $1.68 \times 10^5$ g/(cm$^2 \cdot$s). The acoustic impedance of the material of the tubular body 5 is equal to the acoustic impedance of such a living body. Examples of the material of the tubular body 5 include silicon rubber. The acoustic impedance of silicon rubber can be adjusted according to the mixture of materials, and can be adjusted in the range of, for example, about $1.0 \times 10^5$ g/(cm$^2 \cdot$s) to about $2.0 \times 10^5$ g/(cm$^2 \cdot$s). Alternatively, as the tubular body 5, a cell sheet, an extracted blood vessel, and the like may be used. Even in this case, the acoustic impedance of the material of the tubular body 5 is equal to the acoustic impedance of a body lumen into which the medical device 8 is to be inserted.

As described above, examples of the material of the tubular body 5 include silicon rubber and the like. On the other hand, as described above, examples of the material of the main body portion 3 include a resin, such as polycarbonate. For this reason, the hardness of the material of the main body portion 3 is higher than the hardness of the material of the tubular body 5. The hardness of the material of the main body portion 3 and the hardness of the material of the tubular body 5 can be measured, for example, by Rockwell hardness, Durometer hardness, or the like.

Here, an example of the medical device of this embodiment will be described with reference to FIG. 6.

FIG. 6 is a plan view illustrating an example of the medical device of the exemplary embodiment.

The medical device 8 illustrated in FIG. 6 is a catheter for ultrasonography that accommodates an imaging core 82 for ultrasonography in the catheter and is inserted into a body lumen. That is, the medical device 8 illustrated in FIG. 6 is a catheter for image diagnosis that is used for intravascular ultrasound (IVUS) for acquiring a diagnostic image used to diagnose an affected portion or the like in a living body.

In accordance with an exemplary embodiment, the medical device 8 illustrated in FIG. 6 is connected to an external drive apparatus (not illustrated) for holding the medical device 8 and driving the imaging core 82, and can be used to mainly diagnose the inside of a blood vessel. Alternatively, the medical device 8 may be used to treat the inside of a blood vessel. In this specification, a side to be inserted into the lumen of a living body is referred to as a "distal end" or a "distal side", and a hand side to be operated is referred to as a "proximal end" or a "proximal side".

The medical device 8 includes a shaft portion 81, the imaging core 82, and an operation unit 83.

The shaft portion 81 includes a first tubular body 811 and a second tubular body 812, and is inserted into a body lumen. The first and second tubular bodies 811 and 812 are heat-welded (or bonded) to each other. A lumen 813 for image to which the imaging core 82 is to be inserted is formed in the first tubular body 811 from the distal side of the first tubular body 811 to the proximal side of the first tubular body 811. A guide wire lumen 84 into which a guide wire W is to be inserted is formed in the second tubular body 812. The guide wire lumen 84 includes a guide wire-lumen distal portion 841 that is provided on the distal side of the shaft portion 81 in the direction of an axis X1, and a guide wire-lumen proximal portion 842 that is provided on the proximal side of the shaft portion 81 in the direction of the axis X1. The guide wire-lumen distal portion 841 and the guide wire-lumen proximal portion 842 are provided to be spaced apart (i.e., away) from each other without being connected to each other. The guide wire-lumen distal portion 841 is disposed on the extension line of the guide wire-lumen proximal portion 842 (coaxially with the guide wire-lumen proximal portion 842). For this reason, the guide wire W linearly passes through the guide wire lumen 84. Meanwhile, the guide wire lumen 84 does not necessarily need to include the guide wire-lumen distal portion 841 and the guide wire-lumen proximal portion 842, and may be formed as one lumen.

A distal side opening portion 843 of the guide wire lumen 84 is provided on a distal portion of the shaft portion 81. A proximal side opening portion 844 of the guide wire lumen 84 is provided between the distal portion and the proximal portion of the shaft portion 81. That is, a lumen between the distal side opening portion 843 and the proximal side opening portion 844 functions as the guide wire lumen 84. A rapid exchange structure where the proximal side opening portion 844 of the guide wire lumen 84 is present in the body of a patient is employed for the guide wire lumen 84 illustrated in FIG. 6 in this way. However, the structure of the guide wire lumen is not limited to the rapid exchange structure, and may be an over-the-wire structure where the proximal side opening portion of the guide wire lumen is present outside the body of a patient. In a case in which the over-the-wire structure is employed, the guide wire lumen is formed in the first tubular body 811 from the distal side of the first tubular body 811 to the proximal side of the first tubular body 811 as in the case of the lumen 813 for image.

In accordance with an exemplary embodiment, the shaft portion 81 is made of a flexible material that has high permeability to ultrasound waves. The material of the shaft portion 81 is not particularly limited. Examples of the material of the shaft portion 81 include various thermoplastic elastomers, such as a styrene elastomer, a polyolefin elastomer, a polyurethane elastomer, a polyester elastomer, a polyamide elastomer, a polyimide elastomer, a polybutadiene elastomer, a trans-polyisoprene elastomer, a fluororubber elastomer, a chlorinated polyethylene elastomer, and a polyethylene elastomer. Further, one of the materials of the shaft portion 81 or a combination (a polymer alloy, a polymer blend, a laminated body or the like) of two or more of the materials of the shaft portion 81 can be applied as the material of the shaft portion 81.

The imaging core 82 is disposed in the lumen 813 for image so as to be slidable in the direction of the axis X1 of the shaft portion 81. The imaging core 82 includes a transducer unit (imaging unit) 821 that transmits ultrasound waves to a biological tissue from the inside of a body lumen and receives ultrasound waves reflected by the biological tissue, a drive shaft 822 which the transducer unit 821 is mounted on the distal end of the drive shaft 822 and rotates the transducer unit 821, and a rotation stabilizing coil 823 that is mounted on the distal end of the transducer unit 821. The transducer unit 821 of this embodiment corresponds to an "imaging unit" of the disclosure. Since the drive shaft 822 transmits the power of rotation, the transducer unit 821 is rotated in a body lumen, such as a blood vessel, and can acquire the image of a target lesion over a circumferential direction. Further, a signal line, which is used to transmit signals, which are detected by the transducer unit 821, to the operation unit 83, is disposed in the drive shaft 822.

The operation unit 83 is provided on the proximal side of the shaft portion 81 through a hub 85. The hub 85 is provided on the proximal side of the shaft portion 81, surrounds the shaft portion 81 led out of the hub 85 in a direction toward the distal end, and suppresses the kink of the shaft portion 81. The imaging core 82 passes through the inside of the hub 85. A distal portion of the hub 85 is connected to an introducer sheath that is percutaneously inserted into a body lumen.

The operation unit 83 is connected to an external drive apparatus (not illustrated) to operate the imaging core 82. The operation unit 83 includes an outer tube 831 of which a part is inserted into the hub 85 and is connected to the first tubular body 811, a unit connector 832 that is connected to a proximal portion of the outer tube 831, an inner tube 833 that is movable relative to the outer tube 831 in the direction of an axis, and an operation proximal portion 834 that is connected to a proximal portion of the inner tube 833.

The operation proximal portion 834 holds the drive shaft 822 and the inner tube 833. In a case in which the operation proximal portion 834 is moved so that and the inner tube 833 is pushed into the unit connector 832 and the outer tube 831 or is pulled out of the unit connector 832 and the outer tube 831, the drive shaft 822 interlocks and slides in the shaft portion 81 in the direction of the axis X1. That is, when the inner tube 833 is pushed to the maximum, the transducer unit 821 is positioned near the distal end of the lumen 813 for image. On the other hand, when the inner tube 833 is pulled to the maximum, the transducer unit 821 is retracted into the lumen 813 for image and is accommodated in a region positioned between the distal side and the proximal side of the lumen 813 for image while the shaft portion 81 remains in the body lumen. As described above, to create the tomographic image of a blood vessel or the like, the transducer unit 821 can be moved in the direction of the axis X1 while being rotated in the lumen 813 for image.

A port 835 to which a saline (i.e., saline solution) used for priming is to be injected is formed on the operation proximal portion 834. The port 835 communicates with the lumen 813 for image. Further, the operation proximal portion 834 is provided with a hub-side connector 836 that is connected to the proximal portion of the drive shaft 822. One end of the signal line is connected to the hub-side connector 836. The other end of the signal line is connected to the transducer unit 821 through the inside of the drive shaft 822. Ultrasound waves are applied to a biological tissue from the transducer unit 821 according to signals that are transmitted to the transducer unit 821 from the external drive apparatus through the hub-side connector 836 and the signal line. Further, signals, which are detected by the transducer unit 821 through the receipt of ultrasound waves, are transmitted to the external drive apparatus through the signal line and the hub-side connector 836.

The proximal portion of the outer tube 831, which is connected to the first tubular body 811, is inserted so as to be fitted into the unit connector 832. The inner tube 833, which extends from the operation proximal portion 834, is inserted into the outer tube 831. The unit connector 832 is connected to and held by the external drive apparatus.

Returning to FIGS. 1 to 5, for example, in a case in which the entire human body model is made of a soft material, such as silicon rubber, a difference between the acoustic impedance of a body lumen, such as a blood vessel, and the acoustic impedance of the human body model can be suppressed but there is a concern that, for example, the dimensions of the human body model are changed or a stent placed in the human body model is deformed. Further, even in a case in which a mechanism for positioning the axis of the shaft portion of the medical device relative to the human body model is provided, there is a concern that the accuracy of positioning of the axis may deteriorate. For this reason, there is a concern that the reproducibility of observation or measurement of, for example, a simulated blood vessel may deteriorate in regard to basic study, technique acquisition, or the like for the medical device.

On the other hand, in a case in which the entire human body model is made of a material of which the hardness is higher than the hardness of silicon rubber, a difference between the acoustic impedance of a body lumen, such as a blood vessel, and the acoustic impedance of the human body model is increased. For this reason, the image of the human body model, which is acquired by the medical device, is significantly different from the image of a body lumen that is to be acquired by the medical device during surgery. For example, the brightness of the image of the human body model acquired by the medical device is relatively increased, but the brightness of the image of a body lumen to be acquired by the medical device during surgery is relatively reduced. Further, in a case in which the entire human body model is made of a hard material, a stent, which is expanded and placed in the human body model, may recoil. For this reason, it is difficult to pressure-fix the stent in the human body model.

In contrast, the acoustic impedance of the material of the tubular body 5 of the human body model 2 of the exemplary embodiment is equal to the acoustic impedance of a body lumen. For this reason, a difference between the acoustic impedance of a body lumen, such as a blood vessel, and the acoustic impedance of the tubular body 5 of the human body model 2 can be relatively suppressed (or prevented). For this reason, the image of the human body model 2 acquired by the medical device 8 is equal to the image of a body lumen to be acquired by the medical device 8 during surgery. That is, an image acquired by the medical device 8 can be made close to the image of a body lumen to be acquired during surgery. Further, since the tubular body 5 provided in the lumen 35 is made of a soft material having acoustic impedance equal to the acoustic impedance of a body lumen, the recoil of a stent, which is expanded and placed in the tubular body 5, can be relatively suppressed (or prevented). Accordingly, the stent is pressure-fixed in the tubular body 5.

Furthermore, the hardness of the material of the main body portion 3 is higher than the hardness of the material of the tubular body 5. For this reason, even in a case in which the tubular body 5 provided in the lumen 35 is made of a soft material having acoustic impedance equal to the acoustic impedance of a body lumen, the main body portion 3 can suppress a change in the dimensions of the tubular body 5 or the deformation of a stent placed in the tubular body 5. In addition, in a case in which the first and second holding portions 41 and 42 for positioning the axis of the shaft portion 81 of the medical device 8 relative to the lumen 35 are provided, the deterioration of the accuracy of positioning of the axis can be suppressed. Accordingly, the deterioration of the reproducibility of observation or measurement of, for example, a simulated blood vessel can be suppressed in regard to basic study, technique acquisition, or the like for the medical device 8.

Further, the tubular body 5 is provided over the entire length of the lumen 35 in the embodiment illustrated in FIG. 5. For this reason, the deterioration of the reproducibility of observation or measurement of, for example, a simulated blood vessel can be suppressed over the entire length of the lumen 35. Furthermore, an image acquired by the medical device 8 over the entire length of the lumen 35 can be made close to the image of a body lumen to be acquired during surgery. Accordingly, a user of the human body model 2 of the exemplary embodiment can perform basic study, technique acquisition, or the like for the medical device 8 by effectively using the entire length of the lumen 35.

Next, a modification example of the main body portion and the tubular body of this embodiment will be described with reference to the drawings.

Meanwhile, in a case in which components of a main body portion 3A of this modification example are the same as the components of the main body portion 3 described above with reference to FIGS. 1 to 5 and a case in which components of a tubular body 5A of this modification example are the same as the components of the tubular body 5 described above with reference to FIGS. 1 to 5, repeated description will be appropriately omitted and differences between this modification example and the exemplary embodiment will be mainly described below.

Figure 7:
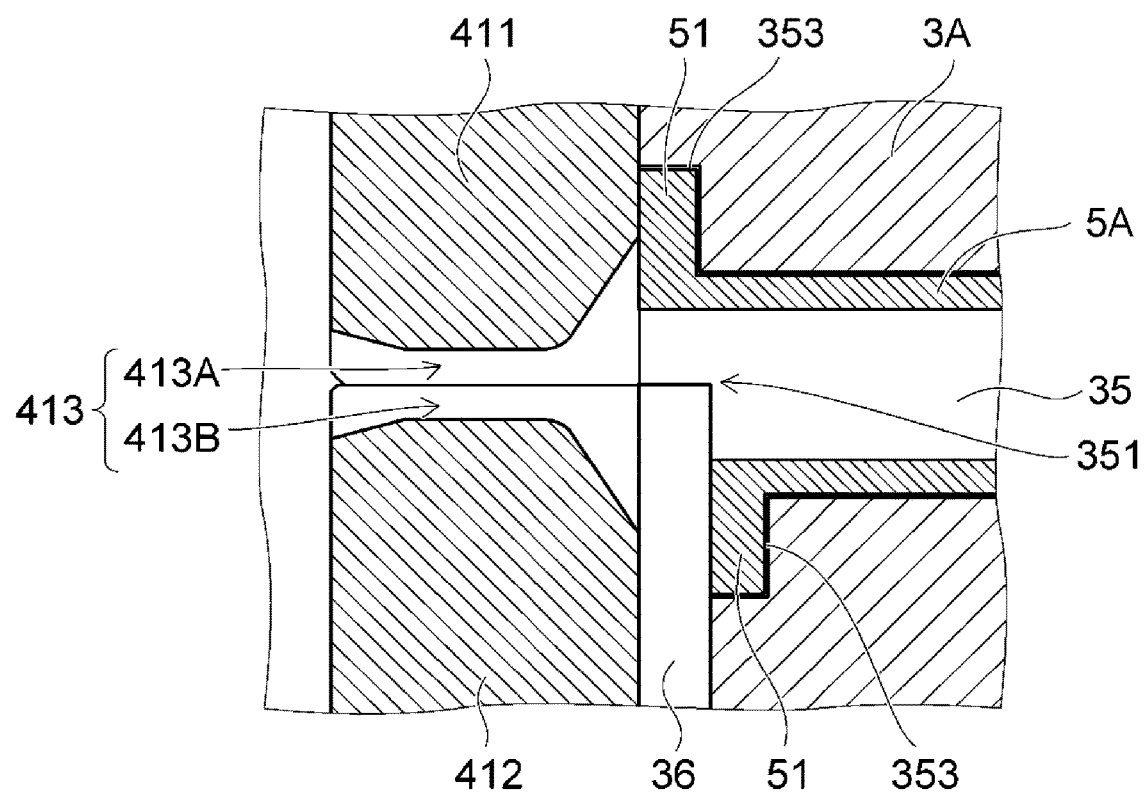
FIG. 7 is a cross-sectional view illustrating a modification example of a main body portion and a tubular body of the exemplary embodiment.
Figure 8:
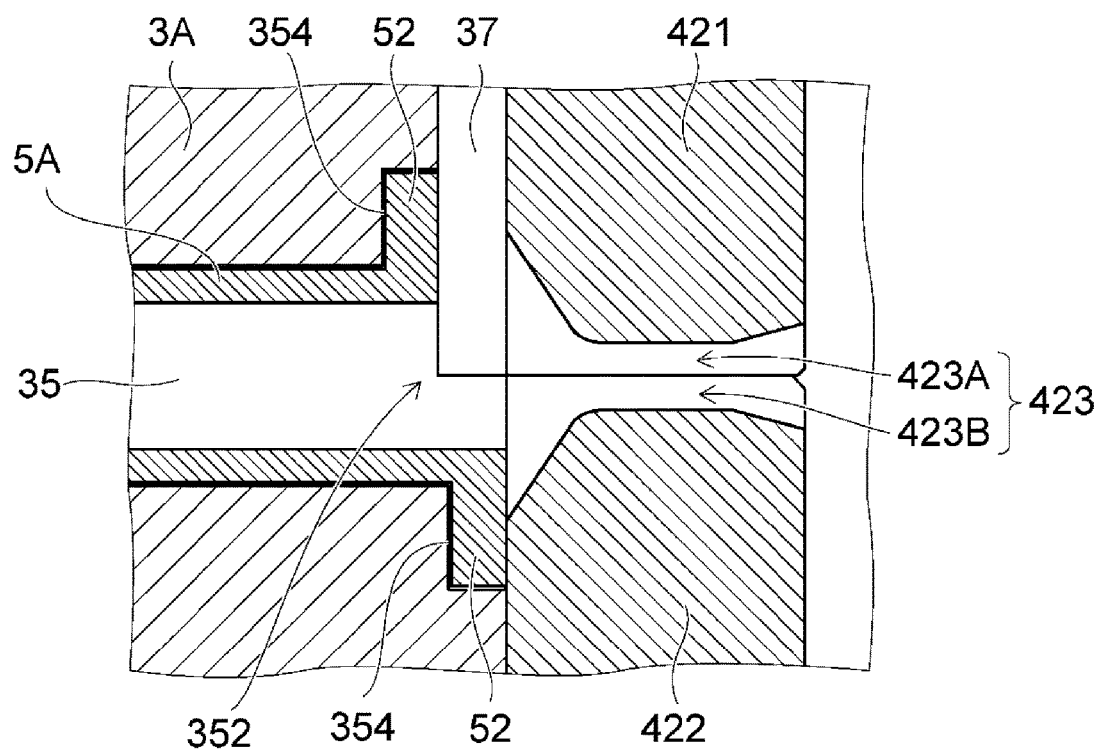
FIG. 8 is a cross-sectional view illustrating the modification example of the main body portion and the tubular body of the exemplary embodiment.

FIGS. 7 and 8 are cross-sectional views illustrating the modification example of the main body portion and the tubular body of the exemplary embodiment of the modification example.

Meanwhile, FIG. 7 corresponds to an enlarged view enlarging and illustrating a region A31 illustrated in FIG. 5. FIG. 8 corresponds to an enlarged view enlarging and illustrating a region A32 illustrated in FIG. 5.

The main body portion 3A of this modification example includes one of a convex portion and a concave portion that are fitted to each other. Further, the tubular body 5A of this modification example includes the other of the convex portion and the concave portion that are fitted to each other. Specifically, as illustrated in FIGS. 7 and 8, the main body portion 3A of this modification example includes a first concave portion 353 that is provided on one end portion 351 of the lumen 35 and a second concave portion 354 that is provided on the other end portion 352 of the lumen 35. Furthermore, the tubular body 5A of this modification example includes a first convex portion 51 that is fitted to the first concave portion 353 of the main body portion 3A and a second convex portion 52 that is fitted to the second concave portion 354 of the main body portion 3A. That is, the first concave portion 353 of the main body portion 3A and the first convex portion 51 of the tubular body 5A are fitted to each other. The second concave portion 354 of the main body portion 3A and the second convex portion 52 of the tubular body 5A are fitted to each other.

In the example illustrated in FIGS. 7 and 8, each of the first and second concave portions 353 and 354 is provided as a counterbored portion (i.e., each of the first and second concave portions 353 and 354 have a cylindrical flat-bottomed hole that enlarges another coaxial hole). Each of the first and second convex portions 51 and 52 is provided as a flange portion. However, each of the first and second concave portions 353 and 354 is not limited to a counterbored portion, and may be, for example, a hole or a groove provided on the inner wall of the lumen 35. Further, each of the first and second convex portions 51 and 52 may be a projection portion provided on the outer surface of the tubular body 5A. Furthermore, the first and second concave portions 353 and 354 are not limited to concave portions provided on the main body portion 3A, and may be provided on the tubular body 5A. Moreover, the first and second convex portions 51 and 52 are not limited to convex portions provided on the tubular body 5A, and may be provided on the main body portion 3A.

In accordance with an exemplary embodiment, as long as the first concave portion 353 and the first convex portion 51 are fitted to each other, the first concave portion 353 may be provided on one of the main body portion 3A and the tubular body 5A and the first convex portion 51 may be provided on the other of the main body portion 3A and the tubular body 5A. Further, as long as the second concave portion 354 and the second convex portion 52 are fitted to each other, the second concave portion 354 may be provided on one of the main body portion 3A and the tubular body 5A and the second convex portion 52 may be provided on the other of the main body portion 3A and the tubular body 5A.

According to this modification example, the movement of the tubular body 5A provided in the lumen 35 can be suppressed (or prevented) when the medical device 8 is inserted into the lumen 35 of the main body portion 3A or removed from the lumen 35 of the main body portion 3A.

Next, human body models according to modification examples of this embodiment will be described with reference to the drawings.

Meanwhile, in a case in which components of the human body models according to the modification examples of this embodiment are the same as the components of the human body model according to this embodiment described above with reference to FIGS. 1 to 5, repeated description will be appropriately omitted and differences between the modification examples and this embodiment will be mainly described below.

Figure 9A:
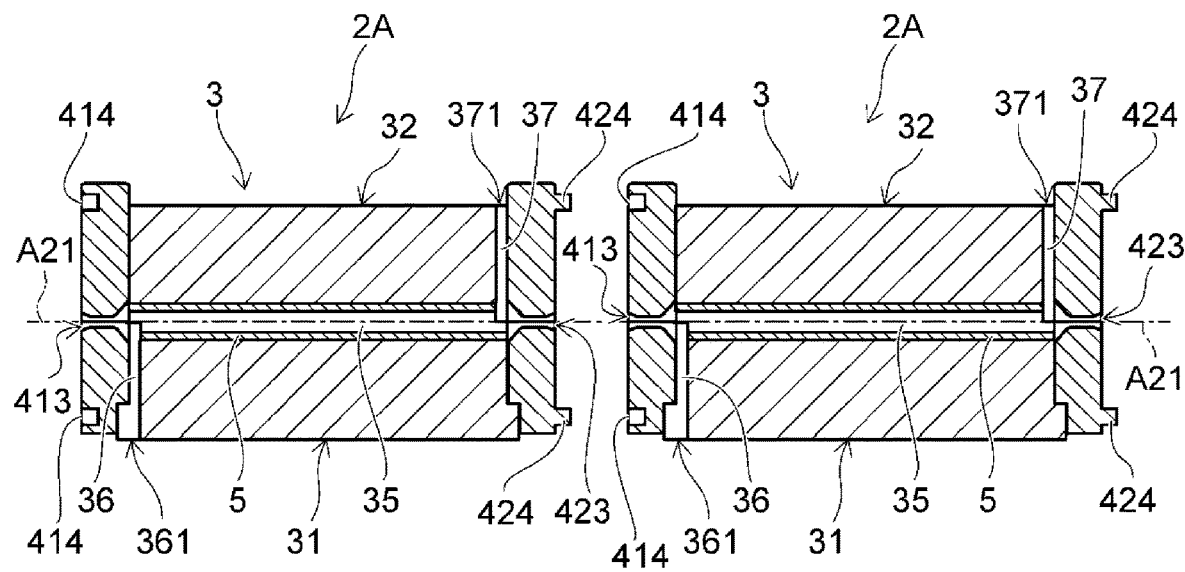
FIGS. 9A and 9B are cross-sectional views of a human body model of another example of the exemplary embodiment.
Figure 9B:
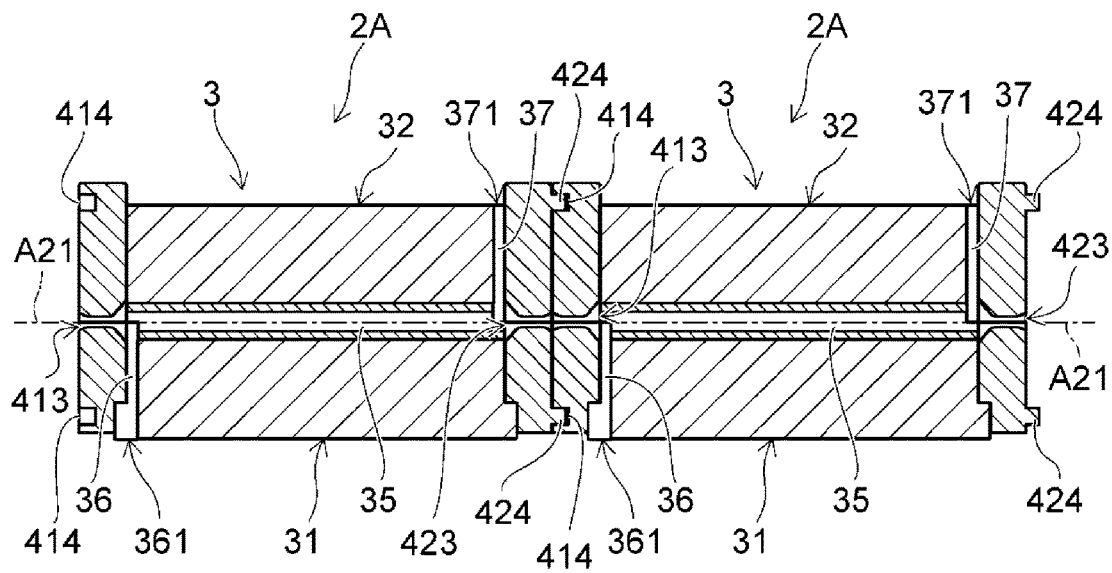

FIGS. 9A and 9B are cross-sectional views of a human body model of another example of the exemplary embodiment.

FIG. 9A is a cross-sectional view illustrating a state in which two human body models 2A are not yet connected to each other. FIG. 9B is a cross-sectional view illustrating a state in which the two human body models 2A are connected to each other. Further, FIGS. 9A and 9B correspond to cross-sectional views taken along the cutting plane A-A illustrated in FIG. 1.

The human body model 2A according to this modification example is provided with shaft portions 424 that protrude outward from the outer surface of the human body model 2A substantially in parallel with the axis A21 of the lumen 35, and holes 414 that are recessed inward from the outer surface of the human body model 2A substantially in parallel with the axis A21 of the lumen 35. As illustrated in FIG. 9B, the shaft portions 424 can be fitted to the holes 414. The installation positions of the shaft portions 424 and the number of the shaft portions 424 to be installed are not particularly limited. For example, the shaft portions 424 are provided on at least one of the second guide portion 44 and the second fixed portion 422. The installation positions of the holes 414 and the number of the holes 414 to be installed are not particularly limited. For example, the holes 414 are provided on at least one of the first guide portion 43 and the first fixed portion 412.

Alternatively, the shaft portions 424 may be provided on at least one of the first guide portion 43 and the first fixed portion 412. The holes 414 may be provided on at least one of the second guide portion 44 and the second fixed portion 422. Further, in a case in which a plurality of holes 414 are provided, all the holes 414 may not have the same shape. For example, one of the plurality of holes 414 may be a round hole, and another hole of the plurality of holes 414 may be a so-called long hole including arcs and straight lines. The other structures are the same as those of the human body model 2 described above with reference to FIGS. 1 to 5.

According to this modification example, the plurality of human body models 2A can be connected along the axis A21 of the lumen 35 as illustrated in FIG. 9B. The measurable range of the medical device 8 in a longitudinal direction is in the range of, for example, about 100 mm to 150 mm, and is longer than the length of the stent. For this reason, in a case in which a user connects the plurality of human body models 2A along the axis A21 of the lumen 35, the user can continuously acquire images of the inside of the lumen 35 by performing pull-back, which moves the transducer unit 821 (see FIG. 6) of the medical device 8 to the proximal side in the direction of the axis X1, only one time. Accordingly, basic study for the medical device can be made relatively efficient. Further, the plurality of human body models 2A may be placed on a jig, such as a tray to which the human body models 2A are to be fitted, and be connected along the axis A21 of the lumen 35. In this case, a user can easily and accurately connect the plurality of human body models 2A along the axis A21 of the lumen 35 by placing the plurality of human body models 2A to be fitted to the jig. Accordingly, basic study for the medical device can be made relatively efficient.

Furthermore, as described above with reference to FIGS. 1 to 5, the first holding portion 41 can position the axis of the shaft portion 81 (specifically, the first tubular body 811) of the medical device 8 relative to the lumen 35 in a state in which the shaft portion 81 (specifically, the first tubular body 811) of the medical device 8 passes through the first through-hole 413. Moreover, the second holding portion 42 can position the axis of the shaft portion 81 (specifically, the first tubular body 811) of the medical device 8 relative to the lumen 35 in a state in which the shaft portion 81 (specifically, the first tubular body 811) of the medical device 8 passes through the second through-hole 423.

For this reason, it is possible to suppress (or prevent) the catching of the medical device 8 that is caused by the human body models 2A when the medical device 8 passes through boundary portions of the plurality of human body models 2A. That is, there is a concern that, for example, the distal portion of the medical device may be caught by the peripheral portion of the first through-hole when passing through the second through-hole of one human body model of a plurality of human body models adjacent to each other and then passing through the first through-hole of another human body model of the plurality of human body models adjacent to each other.

In contrast, in the human body model 2A according to this modification example, the first holding portion 41 can position the axis of the shaft portion 81 of the medical device 8 relative to the lumen 35 in a state in which the shaft portion 81 of the medical device 8 passes through the first through-hole 413. Further, the second holding portion 42 can position the axis of the shaft portion 81 of the medical device 8 relative to the lumen 35 in a state in which the shaft portion 81 of the medical device 8 passes through the second through-hole 423. Accordingly, it is possible to suppress (or prevent) the catching of the medical device 8 that is caused by the human body models 2A when the medical device 8 passes through boundary portions of the plurality of human body models 2A.

Figure 10:
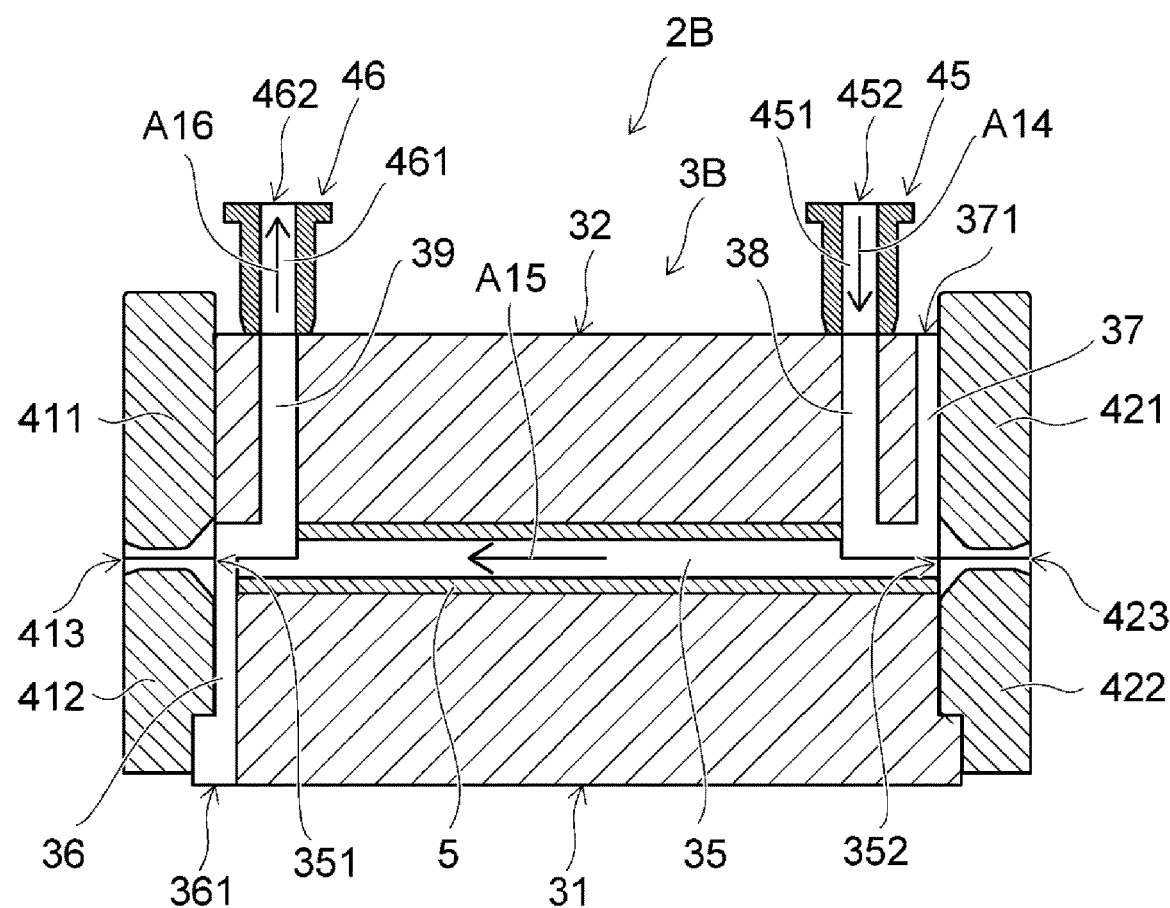
FIG. 10 is a cross-sectional view of a human body model of a further example of the exemplary embodiment.

FIG. 10 is a cross-sectional view of a human body model of a further example of this embodiment.

Meanwhile, FIG. 10 corresponds to a cross-sectional view taken along the cutting plane A-A illustrated in FIG. 1.

The human body model 2B of this modification example includes a main body portion 3B, a first lure port 45, and a second lure port 46.

The main body portion 3B includes a third flow path 38 and a fourth flow path 39. One end portion of the third flow path 38 is connected to the second outer surface 32 of the main body portion 3B, and is opened to the second outer surface 32. The other end portion of the third flow path 38 is connected to the lumen 35 of the main body portion 3B. One end portion of the fourth flow path 39 is connected to the lumen 35 of the main body portion 3B. The other end portion of the fourth flow path 39 is connected to the second outer surface 32 of the main body portion 3B, and is opened to the second outer surface 32.

The first and second lure ports 45 and 46 are provided on the second outer surface 32 of the main body portion 3B. The first lure port 45 includes a first lure port-flow path 451 connected to the third flow path 38. One end portion of the first lure port-flow path 451 is opened to the outside of the first lure port 45 as an opening portion 452. The other end portion of the first lure port-flow path 451 is connected to the third flow path 38 of the main body portion 3B. The second lure port 46 includes a second lure port-flow path 461 connected to the fourth flow path 39. One end portion of the second lure port-flow path 461 is connected to the fourth flow path 39 of the main body portion 3B. The other end portion of the second lure port-flow path 461 is opened to the outside of the second lure port 46 as an opening portion 462. The other structures are the same as those of the human body model 2 described above with reference to FIGS. 1 to 5.

According to this modification example, a user can allow liquid to flow into the first lure port-flow path 451 from the opening portion 452 of the first lure port 45 as illustrated by an arrow A14 of FIG. 10. Since the third flow path 38 is connected to the lumen 35, the liquid flowing into the first lure port-flow path 451 flows through the third flow path 38 and is guided to the lumen 35. As illustrated by an arrow A15 of FIG. 10, the liquid guided to the lumen 35 flows to one end portion 351 of the lumen 35 from the other end portion 352 of the lumen 35. Since the fourth flow path 39 is connected to the lumen 35, the liquid flowing to one end portion 351 of the lumen 35 is guided to the fourth flow path 39. As illustrated by an arrow A16 of FIG. 10, the liquid guided to the fourth flow path 39 flows through the fourth flow path 39 and flows to the outside of the main body portion 3B from the opening portion 462.

According to this, simulated blood flow can be formed in the lumen 35 of the main body portion 3B. For this reason, a blood cell echo as a blood cell image in intravascular ultrasound (IVUS) can be reproduced.

Exemplary embodiments of the invention have been described above. However, the invention is not limited to the exemplary embodiments, and can be changed in various ways without departing from the claims. A part of the structures of the embodiment may be omitted, or the structures of the exemplary embodiments may be arbitrarily combined in a way different from the above description.

The detailed description above describes a human body model used for at least one of basic study and technique acquisition for a medical device that is inserted into a body lumen and acquires the image of the inside of the body lumen by using ultrasound waves. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A human body model used for at least one of basic study and technique acquisition for a medical device that is inserted into a body lumen and acquires an image of an inside of the body lumen by using ultrasound waves, the human body model comprising:
a main body portion having a lumen passing through a portion of the main body portion between a first surface of the main body portion and a second surface of the main body portion, the second surface of the main body portion being arranged on a side opposite to the first surface of the main body portion, the main body portion including one of a convex portion and a concave portion that are fitted to each other;
a tubular body provided in at least a part of the lumen, the tubular body being made of a material different from a material of the main body portion, the tubular body including an other of the convex portion and the concave portion that are fitted to each other;

an acoustic impedance of the material of the tubular body being equal to an acoustic impedance of the body lumen; and a hardness of the material of the main body portion being higher than a hardness of the material of the tubular body.

2. The human body model of claim 1, wherein the tubular body extends over an entire length of the lumen.

3. The human body model of claim 1, wherein the material of the tubular body is a silicon rubber having an acoustic impedance of between $1.0 \times 10^5$ g/(cm²·s) to $2.0 \times 10^5$ g/(cm²·s).

4. The human body model of claim 3, wherein the material of the tubular body has an acoustic impedance of between $1.40 \times 10^5$ g/(cm²·s) to $1.68 \times 10^5$ g/(cm²·s).

5. The human body model of claim 1, wherein the tubular body comprises a plurality of tubular bodies, each of the plurality of tubular bodies being arranged at predetermined intervals along a longitudinal direction of the lumen.

6. The human body model of claim 1, wherein the main body portion has a shape of a rectangular parallelepiped.

7. The human body model of claim 1, wherein the material of the main body portion is transparent.

8. The human body model of claim 1, wherein the lumen is configured to receive a medical device.

9. The human body model of claim 8, wherein the medical device is a catheter for ultrasonography.

10. The human body model of claim 1, wherein the lumen is filled with a liquid, the liquid being blood, saline, water, or simulated blood.

11. The human body model of claim 1, wherein the lumen has a first opening portion on one end portion of the lumen and a second opening portion on an other end portion of the lumen, and one or more of the first opening portion and the second opening portion having a flow path toward the one end portion or the other end portion with a reduced cross-sectional area.

12. The human body model of claim 1, wherein the tubular body is a cell sheet or an extracted blood vessel.

13. A system for at least one of basic study and technique acquisition for a medical device that is inserted into a body lumen and acquires an image of an inside of the body lumen using ultrasound waves, the system comprising:

a plurality of human body models, each of the plurality of human body models including a main body portion having a lumen passing through a portion of the main body portion between a first surface of the main body portion and a second surface of the main body portion, the second surface of the main body portion being arranged on a side opposite to the first surface of the main body portion, a tubular body provided in at least a part of the lumen, the tubular body being made of a material different from a material of the main body portion, and an acoustic impedance of the material of the tubular body being equal to an acoustic impedance of the body lumen; and each of the plurality of human body models being connected along a longitudinal axis of each of the lumens.

14. The system of claim 13, further comprising:

a hardness of the material of the main body portion being higher than a hardness of the material of the tubular body for each of the plurality of human body models.

15. The system of claim 13, wherein the tubular body of each of the plurality of human body models extends over an entire length of the lumen of the main body portion.

16. The system of claim 13, wherein each of the main body portion of the plurality of human body models includes one of a convex portion and a concave portion that are fitted to each other, and each of the tubular body includes an other of the convex portion and the concave portion that are fitted to each other.

17. A method for at least one of basic study and technique acquisition for a medical device that is inserted into a body lumen and acquires an image of an inside of the body lumen using ultrasound waves, the method comprising:

providing a plurality of human body models, each of the plurality of human body models including a main body portion having a lumen passing through a portion of the main body portion between a first surface of the main body portion and a second surface of the main body portion, the second surface of the main body portion being arranged on a side opposite to the first surface of the main body portion, a tubular body provided in at least a part of the lumen, the tubular body being made of a material different from a material of the main body portion, and wherein an acoustic impedance of the material of the tubular body is equal to an acoustic impedance of the body lumen;

connecting each of the plurality of human body models to one another along a longitudinal axis of each of the lumens; and inserting the medical device into the lumens of the plurality of human body models.

* * * * *